United States Patent [19]

Reimschuessel

[11] 4,397,979
[45] Aug. 9, 1983

[54] POLYMER COMPOSITION CONTAINING LITHIUM, MANGANESE OR ZIRCONIUM NUCLEATING AGENT

[75] Inventor: Herbert K. Reimschuessel, Morristown, N.J.

[73] Assignee: Allied Corporation, Morris Township, Morris County, N.J.

[21] Appl. No.: 289,618

[22] Filed: Aug. 3, 1981

[51] Int. Cl.³ ............... C08L 67/02; C08L 77/02; C08L 77/06
[52] U.S. Cl. ............... 524/413; 524/401; 524/417; 524/437; 524/444; 524/601; 524/605; 524/606
[58] Field of Search ............... 524/413, 417, 437, 444, 524/401

[56] References Cited

U.S. PATENT DOCUMENTS

| 154,340 | 8/1874 | Moore | 126/337 R |
|---|---|---|---|
| 3,329,715 | 7/1967 | Strohmeyer et al. | 524/413 |
| 3,591,565 | 7/1971 | Hansen | 525/4 |
| 3,624,041 | 11/1971 | Brandrup et al. | 525/4 |
| 4,167,614 | 9/1979 | Ciferri et al. | 525/4 |

FOREIGN PATENT DOCUMENTS 866252 3/1971 Canada.
1211685 11/1970 United Kingdom.

Primary Examiner—Harold D. Anderson
Attorney, Agent, or Firm—Richard C. Stewart, II; Gerhard H. Fuchs; Alan M. Doernberg

[57] ABSTRACT

A polymer composition having improved physical properties, and a method of preparing same.

9 Claims, No Drawings

POLYMER COMPOSITION CONTAINING LITHIUM, MANGANESE OR ZIRCONIUM NUCLEATING AGENT

DESCRIPTION

BACKGROUND OF THE INVENTION

1. Field of the Invention

This invention relates to modified polymer compositions having carbonyl functions as an integral part of the recurring unit, such as polyamide and polyester compositions, which exhibit improved physical properties. More particularly, this invention relates to such compositions comprising a novel nucleating agent.

2. Brief Description of the Prior Art

Polymers having carbonyl functions as for example polyamide compositions, such as poly(hexamethylene adipamide), poly(caprolactam) and the like, and thermoplastic polyesters, such as poly(ethylene terephthalate), poly(butylene terephthalate) and the like, can be produced on a large scale at relatively low cost, and have found extensive use in the production of molding compositions and fibers. When employing polyamide and polyester compositions for such uses, it is desirable that the compositions possess stable and fine crystalline structures, which usually accompany desirable physical properties. In the prior art, it is known that these desirable physical properties, as well as faster molding cycles and greater productivity in molding operations can be achieved by increasing the rate of crystallization of the molding composition. Various prior art references disclose that increased rates of crystallization involve a process of nucleation in which various kinds of inorganic, organic and polymeric compositions may be employed as nucleation agents. For example, Great Britain Patent No. 1,211,685 and German Pat. No. 1,694,476 disclose that substances such as calcium fluoride, molybdenum disulfide, lead tungstate, antimony trioxide, graphite, talcum and asbestos are effective nucleation agents.

SUMMARY OF THE INVENTION

In accordance with this invention, there is provided a polymeric composition having an increased rate of crystallization. The composition of this invention comprises:

a polymer selected from the group consisting of polymers having one or more carbonyl functions as an integral part of the recurring unit and polymer backbone and mixtures thereof; and a nucleation agent selected from the group consisting of lithium metasilicate, lithium aluminate, lithium metaphosphate, lithium fluoride, manganese fluoride, zirconium tetrafluoride, zirconium silicate and mixtures thereof in an amount such that the $(\Delta T_c)_m$ of said composition is less than the $(\Delta T_c)_m$ of said polymer. As used herein "$(\Delta T_c)_m$" is the difference between the melting point of the polymer ($T_m$) and the temperature at which crystallization is first observed upon cooling from the melt ($T_c$).

DETAILED DESCRIPTION OF THE INVENTION

As an essential component, the composition of this invention comprises a polymer having one or more carbonyl functions as an integral part of the recurring unit or mixtures thereof. Illustrative of such polymers are polyamides, polyesters, polyurethanes, polyureas, polycarbonates and the like. Such polymer compositions are well known in the art, and will not be described herein in detail.

Polyesters and polyamides are preferred for use in the practice of this invention. Polyamides useful in the conduct of this invention are those which are produced by polymerizing monoamino monocarboxylic acids, or lactams thereof, or a mixture of a diamine and a dicarboxylic acid optionally together with a monoamino-monocarboxylic acid. Illustrative of such lactams and monocarboxylic acids are ε-amino caproic acid, caprolactam, 9-aminononanoic acid, 11-aminoundecanoic acid, 17-amino-heptadecanoic acid, dodecanolactam, capryllactam and enanthlolactam. Preferred diamines are of the general formula $H_2N(CH_2)_mNH_2$ wherein m is an integer of from about 2 to about 12, such as trimethylene diamine, tetramethylene diamine, pentamethylene diamine, hexamethylene diamine and the like. Preferred dicarboxylic acids are of the formula HOOC—Y—COOH, wherein Y is zero or a divalent aliphatic radical containing at least 1 carbon atom, as for example sebacic acid, octadecanoic acid, suberic acid, azelaic acid, undecanoic acid, glutaric acid, pimelic acid, adipic acid and the like.

Preferred polyamides are Nylon 6 (a polymer of caprolactam); Nylon 66 (a polymer of hexamethylene diamine and adipic acid); Nylon 610 (a polymer of hexamethylene diamine and sebacic acid); Nylon 11 (a polymer of undecanolactam) and; Nylon 12 (a polymer of dodecanolactam). Amongst these preferred polyamides, Nylon 6 and Nylon 66 are particularly preferred, and Nylon 6 is most preferred.

The particular polyester chosen for use can be a homo-polyester or a co-polyester, or mixtures thereof as desired. Polyesters are normally prepared by the condensation of an organic dicarboxylic acid and an organic diol, and, therefore, illustrative examples of useful polyesters will be described hereinbelow in terms of those diol and dicarboxylic acid precursors.

Polyesters which are suitable for use in this invention are preferably linear and saturated polyesters, and are those which are derived from the condensation of aromatic, cycloaliphatic, and aliphatic diols with aliphatic, aromatic and cycloaliphatic dicarboxylic acids. Illustrative of useful aromatic diols, are those having from about 6 to about 12 carbon atoms. Such aromatic diols include bis-(p-hydroxyphenyl) ether; bis-(p-hydroxyphenyl)-thioether; (bis-(p-hydroxyphenyl)-sulphone; (bis-(p-hydroxyphenyl)-methane; 1,2-(bis-(p-hydroxyphenyl)-ethane; 1-phenyl-(bis-(p-hydroxyphenyl)-methane; diphenyl-(bis-p-hydroxyphenyl)-methane; 2,2-bis(4'-hydroxy-3'-dimethylphenyl propane; 1,1- or 2,2-bis-(p-hydroxyphenyl)-butane; 1,1-dichloro- or 1,1,1-trichloro-2,2-(bis-(p-hydroxyphenyl)-ethane; 1,1-(bis-(p-hydroxyphenyl)-cyclopentane; 2,2-(bis-(p-hydroxyphenyl)-propane (bisphenol A); 1,1-(bis-(p-glycol; 2,5-dichloro-p-xylylene glycol; p-xylene-α,α-diol; and the like.

Suitable cycloaliphalic diols include those having from about 5 to about 8 carbon atoms. Exemplary of such useful cycloaliphatic diols are 1,4-dihydroxy cyclohexane; 1,4-dihydroxy methylcyclohexane; 1,3-dihydroxycyclopentane; 1,5-dihydroxycycloheptane; 1,5-dihydroxycyclooctane; 1,4-cyclohexanedimethanol; and the like.

Polyester which are derived from aliphatic diols are preferred for use in this invention. Useful and preferred aliphatic diols include those having from about 2 to about 12 carbon atoms, with those having from about 2 to about 6 carbon atoms being particularly preferred. Illustrative of such preferred diol precursors are 1,2- or 1,3-propylene glycol, 1,6-hexanediol, 1,4-butanediol and geometrical isomers thereof. Propylene glycol, ethylene glycols and 1,4-butanediol are particular preferred as diol precursors of polyesters for use in the conduct of this invention.

Suitable dicarboxylic acids for use as precursors in the preparation of useful polyesters are linear and branched chain saturated aliphatic dicarboxylic acids, aromatic dicarboxylic acids and cycloaliphatic dicarboxylic acids. Aliphatic dicarboxylic acids which can be used are those having from 2 to about 50 carbons atoms, as for example, oxalic acid, malonic acid, dimethylmalonic acid, succinic acid, octadecylsuccinic acid, pimelic acid, adipic acid, trimethyladipic acid, sebacic acid, suberic acid, azelaic acid and dimeric acids (dimerisation products of unsaturated aliphatic carboxylic acids such as oleic acid) and alkylated malonic and succinic acids, such as octadecylcuccinic acid. Illustrative of cycloaliphatic dicarboxylic acids which can be used are those having from about 6 to about 15 carbon atoms, such as 1,3-cyclobutanedicarboxylic acid, 1,3-cyclopentadicarboxylic acid, 1,3- and 1,4-cyclohexane, 4,4'-dicayclohexyldicarboxylic acid, and the like.

Illustrative of polyesters which are preferred for use in this invention are those which are derived from aromatic dicarboxylic acids having from about 8 to about 24 carbon atoms, with those having from about 8 to about 12 carbon atom being particularly preferred. Suitable and preferred aromatic dicarboxylic acids which can be used are, terephthalic acid, isophthalic acid and o-phthalic acid, 1,3-, 1,4-, 2,6 or 2,7-naphthalene-dicarboxylic acid, 4,4'-diphenyldicarboxylic acid, 4,4'-diphenylsulphone-dicarboxylic acid, 1,1,3-trimethyl-5-carboxy-3-(p-carboxyphenyl)indane, diphenyl ether 4,4'-dicarboxylic acid bis-p-(carboxyphenyl)-methane, p-carboxyphenyl acetic acid and the like. Aromatic dicarboxylic acids based on a benzene ring are particularly preferred and amongst these terephthalic acid, isophthalic acid and orthophthalic acid are the dicarboxylic acid precursor of choice.

As is apparent from the foregoing, in the particularly preferred embodiments of this invention, the polyester of choice is the condensation product of a benzene based aromatic dicarboxylic acid having from about 8 to about 12 carbon atoms, such as terephthalic acid, isophthalic acid and the like, and a cycloaliphatic diol such as 1,4-cyclohexane dimethyl glycol, 1,4 cyclohexanediol and the like, and, especially an aliphatic diol having from about 2 to about 8 carbon atoms, such as ethylene glycol, neopentyl diol, 1,4-butanediol, propylene glycol and the like. Illustrative of such useful and particularly preferred polyesters are poly(ethylene terephthalate), poly(1,4-cyclohexane dimethyl) terephthalate and poly(butylene terephthalate). Among these polyesters of choice, poly(ethylene terephthalate) is most preferred.

As a second essential component, the composition of this invention will include a nucleation agent. Nucleation agents suitable for use in the conduct of this invention are selected from the group consisting of lithium metasilicate, lithium aluminate, lithium metaphosphate, lithium fluoride, manganese fluoride, zirconium tetrafluoride, zirconium silicate and mixtures thereof. These compounds are well known compounds which are readily available from commercial sources, or which can be conveniently prepared by well known preparative techniques.

Amongst these useful nucleation agents, zirconium tetrafluoride is preferred. As will be readily apparent from a review of the specific examples, zirconium tetrafluoride is especially useful with polyamides. This nucleation agent improves those physical characteristics which are ultimately determinative of the utility of polymers as molding compositions and in the construction of articles of manufacture, and as fibers and filaments. For example, zirconium tetrafluoride is insoluble in water, accordingly, when employed in preferred amounts causes no or a very little decrease in crystallinity of polymers which can be caused by adsorption of water. Furthermore, such crucial indicators as yield stress, yield elongation, tensile modulus, and flexural modulus increase on addition of optimum amounts of zirconium tetrafluoride. Since it has been known that zirconium tetrafluoride is virtually insoluble in all organic solvents (W. B. Blumenthal, The Chemical Behavior of Zirconium, Van Norstrand Co., Inc. New York, PP 140) and also that polymers are extremely poor solvents for inorganic compounds, it was expected that $ZrF_4$ would exist as a dispersed but distinct second phase in the polymer matrix. This would parallel the behavior of other insoluble inorganic compounds such as talcum often added to crystallizable polymers as nucleating agents to accelerate crystallization from the melt. It was therefore, quite surprising that $ZrF_4$ even when added at concentrations as high as 5% by weight to a representative polymer, Nylon 6, could not be detected by x-ray analysis though $ZrF_4$ by itself gives a very distinct x-ray diffraction pattern. Both quenched and subsequently annealed molded films showed no x-ray diffractions due to $ZrF_4$ but only those of the pure Nylon 6. The presence of zirconium, however, could be readily verified by x-ray fluorescence electron probe micro analysis. It is therefore believed that $ZrF_4$ interacts with the polymer, in all probability with the amide functions, forming complexes along the polymer chain, and that such complexes then become part of the amorphous regions of the semicrystalline polyamide.

Useful nucleation agents are available as crystals, pellets, sticks, powders or the like from commercial sources. For example, reagent, practical, and technical grades of the nucleation agent are commercially available. The grade of the nucleation agent employed in the conduct of this invention is not critical and any of the aforementioned grades can be used effectively. Thus, the nucleation agent need not be absolutely pure and can have up to 5 weight percent of impurities based on the total weight of the polymer component without adversely effecting the physical and chemical properties of the composition of this invention.

The quantity of nucleation agent employed in the composition is critical, and the composition should include sufficient nucleation agent such that the $(\Delta T_c)_m$ value of the composition is less than the $(\Delta T_c)_m$ value of the polymer. As used herein, the $(\Delta T_c)$ value is the difference between the "$T_m$" value which is the melting point of the crystalline polymer or composition as the crystalline form is heated up to above its melting point, and the $T_c$ value which is the temperature at which crystal formation is first observed upon cooling. "$T_m$" and "$T_c$" values, and other information on the crystallization characteristics can be obtained by differential scanning calorimetry. Generally, the polymer sample is heated under argon at a heating rate of 10°/min, to 260°

C. held for 5 minutes and then allowed to cool at a controlled rate of 10°/min. The heat-up tracing exhibits a glass transition and a melting point ($T_m$), whereas the cooling curve shows the exotherm due to crystallization from the melt $(T_c)_m$. Then, the sample is heated again at 260° C., held for 5 minutes at this temperature and is quenched with liquid nitrogen. The heat-up curve indicates again the melting temperature $(T_m)_2$. Finally, the amorphous sample is heated again to 260° C. at a rate of 10° C./min. The corresponding tracing exhibits the glass transition ($T_g$), crystallization of the amorphous polymer $(T_c)_a$, and the melting point $(T_m)_3$.

The magnitude of the decrease in $(\Delta T_c)_m$ obtained with a specific amount of a nucleation agent may vary depending on the particular polyamide or polyester component employed. Generally, there may exist for a specific polymer an optimum concentration of the nucleating agent for obtaining the desired decrease in $(\Delta T_c)_m$. Thus care should be taken, when employing large amounts of nucleation agent. In the preferred embodiments of this invention, the quantity of nucleating agent used will normally be in the range of from about 0.01 to about 20 weight percent and in the particularly preferred embodiments from about 0.1 to about 15 weight percent based on the total weight of the composition. Amongst these particularly preferred embodiments, those which are most preferred will include from about 1 to about 5 weight percent nucleation agent on the same basis.

In addition to the above-described essential components, the molding composition of this invention can include various optional components which are additives commonly employed with polyester and polyamide resins. Such optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art, accordingly, only the preferred optional components will be described herein in detail.

The molding composition of this invention preferably includes a fiber glass or some other particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, etc. such fillers are well known materials and are readily available. The foregoing recited fillers are illustrative only and are not meant to limit the scope of the fillers that can be employed in this invention. In the preferred embodiments of this invention fibrous materials are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer component, and in the particularly preferred embodiment is in the range of from about 30 to about 90 weight percent on the same basis.

It is also very desirable to include a plasticizer in the composition of this invention, and such will be included in the preferred embodiments. The plasticizer allows crystallization of the amorphous areas of the composition to continue at lower temperatures than if a plasticizer is not used. This is particularly important in low temperature molding. The plasticizers which can be used with the composition of the present invention are of the type known in the art as useful in polyamide and linear saturated polyester molding compositions. Preferred, plasticizers are those which are useful with polycaprolactam and polyethylene terephthalate. Such useful plasticizer compositions are well known in the art and accordingly will not be described herein in detail.

The molding composition of this invention can be further modified by the addition of one or more pigments. Illustrative of useful pigments are iron oxide, cadmium red, rhodamine, chrome yellow, chrome green, and phthalocyanine blue.

The molding composition of this invention can be prepared by blending or mixing the essential ingredients, and other optional components, as uniformly as possible employing any conventional blending means. Appropriate blending means, such as melt extrusion, batch melting and the like, are well known in the art, and will not be described herein in greater detail. In one useful procedure, the blending procedure can be carried out at elevated temperatures above the melting point of the polymer and the nucleating agent, in a suitable form as for example, granules, pellets and preferrably powders, is added to the melt with vigorous stirring. Stirring is continued until a homogeneous composition is formed. The nucleating agent can also be added to the melt coated on the surface of small particle inert powders which have a high surface volume rations. The use of such inert powders, as for example fused silica, fused alumina, carbon black and aerogels, and hydrogels of silica or alumina, helps to reduce the amount of nucleating agent required to provide optimum results. Accordingly, such powders will be employed in the conduct of the preferred embodiments of this invention. Blending temperatures and blending pressures, and the order of addition of the various components are not critical and may be varied as desired provided that a substantially homogeneous composition results. The blending procedure can be carried out at elevated temperatures, in which case the polymer component is melted and the solid nucleating agent is admixed therewith by vigorously stirring the melt. Similarly, the various solid components can be granulated, and the granulated components mixed dry in a suitable blender, or for example a Branbury mixer, as uniformly as possible, then melted in an extruder and extruded with cooling.

Alternatively, the composition of this invention can be formulated by dissolving the components in an appropriate inert solvent, after which the solvent is removed by evaporation, or other conventional solvent removing means are employed to provide the composition. The solvent is not critical, the only requirements being that it is inert to the components of the composition, and it is capable of solubilizing the various components, or at least forming dispersions thereof.

The molding compositions according to the invention can be partially crystalline to amorphous, depending on which individual constituents are employed. They are thermoplastic materials from which moulded articles of manufacture having valuable properties can be produced by the conventional shaping processes, such as melt spinning, casting, injection moulding and extruding. Examples of such mouldings are components for technical equipment, apparatus castings, household equipment, sports equipment, components for the electrical and electronics industries and electrical insulations, car components, circuits, fibers and semi-finished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum of properties can be modified in the desired direction in manifold ways.

The molding compositions according to the invention are outstandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films.

Because of the increased moduli exhibited by the composition of this invention, the composition is extremely useful for the manufacture of fibers and filaments, as for example tire cord for pneumatic tires. When yarn produced in accordance with this invention is made into tire cord and the cord is then used for pneumatic tire reinforcement, the life span of the tire is markedly increased.

THE SPECIFIC EXAMPLES

The following specific examples are presented to more particularly illustrate the invention, and should not be construed as being limitations on the scope and spirit of the invention.

In the examples Commercial polycaprolactam Nylon 6 trade designation Capron TM obtained from Allied Corporation under grades 8202 and 8207 were used as the polymeric component. After surface coating of the polymer granules the resulting compositions of Nylon 6 and appropriate inorganic nucleation agents were melt blended in an extruder. In some cases, this process entailed two stages. The first was essentially a compounding at low residence times whereas the second was characterized by an intensive mixing operation.

Information relative to the crystallization characteristics of each composition was obtained by differential scanning calorimetry (DSC). Generally, the polymer sample was heated under argon at a heating rate of 10°/min, to 260° C. held for 5 minutes and then allowed to cool at a controlled rate of 10°/min. The heat-up tracing exhibited a glass transition and a melting point $(T_m)$, whereas the cooling curve showed the exotherm due to crystallization from the melt $(T_c)_m$. Then, the sample was heated again to 260° C., held for 5 minutes at this temperature and quenched with liquid nitrogen. The heat-up curve indicated again the melting temperature $(T_m)_2$. Finally, the amorphous sample was heated again at 10° C./min. The corresponding tracing exhibited the glass transition (Tg), crystallization of the amorphous polymer $(T_c)_a$, and the melting point $(T_m)_3$.

Samples for determination of tensile properties were obtained by compression molding at 260° and by injection molding. Drawn multifilaments were obtained by melt spinning at 260° C. to 265° C. and subsequent drawing at ratios in the range of 3.8:1 to 5.2:1.

EXAMPLE I

Thermal analysis data of melting points $(T_m)$, crystallization temperatures for both the undercooled melt $(T_c)_m$ and the amorphous polymer $(T_c)_a$, and the difference $T_m - (T_c)_m = (\Delta T_c)_m$ for various compositions of this invention are set forth in Table I.

TABLE I

| | THERMAL ANALYSIS DATA | | | | | |
|---|---|---|---|---|---|---|
| COMPOSITION | ADDITIVE | | $T_m$ °C. | $(T_c)_m$ °C. | $(\Delta T_c)_m$ | $(T_c)_a$ °C. |
| | MATERIAL | CONC. (%) | | | | |
| 1 | LiSiO$_3$ | 5 | 221 | 183 | 38 | 69 |
| 2 | LiAlO$_2$ | 5 | 221 | 186 | 35 | 69 |
| 3 | LiPO$_3$ | 5 | 221 | 181 | 40 | 67 |
| 4 | LiF | 2.5 | 221 | 185 | 36 | 68 |
| 5 | MnF$_2$ | 2.5 | 221 | 184 | 37 | 68 |
| 6 | ZrF$_4$ | 1 | 219 | 182 | 37 | 69 |
| 7 | ZrF$_4$ | 2.5 | 217 | 183 | 34 | 73 |
| 8 | ZrF$_4$ | 5 | 214 | 173 | 41 | 83 |
| 9 | ZrF$_4$ | 5 | 216 | 176 | 40 | 82 |
| 10 | ZrF$_4$ | 15 | 204 | 150 | 54 | 106 |
| 11 | ZrF$_4$ + Talc | 2.5 + 1 | 218 | 185 | 33 | 73 |
| 12 | ZrSiO$_4$ | 2.5 | 221 | 183 | 38 | 68 |
| 13 | ZrSiO$_4$ | 1 | 221 | 186 | 35 | 68 |
| 14 | Talc | 1 | 221 | 190 | 31 | 68 |
| 15 | Control | 0 | 221 | 167 | 55 | 70 |

EXAMPLE II

Various compositions were compression molded and their mechanical properties are listed in Tables II and III, in which "UTS" is Ultimate Tensile Strength; "YS" is Yield Strength; "UE" is Ultimate Elongation; "YE" is Yield Elongation; "TM" is the tensile modulus; "FS" is the Flexural Strength; and "FM" is the Flexural Modulus.

In Table II are summarized mechanical properties of compositions of this invention containing lithium salts as nucleating agents.

TABLE II

| | MECHANICAL PROPERTIES OF LI-SALT COMPOSITIONS | | | | | | |
|---|---|---|---|---|---|---|---|
| COMPOSITION | $10^3$UTS PSI | $10^3$YS PSI | UE % | YE % | $10^3$TM PSI | $10^3$FS PSI | $10^3$FM PSI |
| 1 | 10.7 | 11.0 | 11.6 | 6.6 | 46.4 | 19.0 | 54.3 |
| 2 | 10.7 | 10.8 | 19.0 | 6.3 | 47.0 | 18.7 | 54.0 |
| 3 | 11.0 | 11.2 | 12.2 | 6.1 | 46.9 | 20.1 | 56.2 |
| CONTROL | 11.0 | 10.7 | 35.0 | 6.5 | 43.7 | 18.1 | 48.8 |

In Table III are summarized mechanical properties of compositions of this invention containing metal fluorides and zirconium silicate as nucleation agents.

TABLE III
MECHANICAL PROPERTIES OF METAL FLUORIDE COMPOSITIONS

| COMPOSITION | $10^3$UTS PSI | $10^3$YS PSI | UE % | YE % | $10^3$TM PSI | $10^3$FS PSI | $10^3$FM PSI |
|---|---|---|---|---|---|---|---|
| 4 | 8.9 | 11.9 | 50.0 | 6.3 | 50.5 | 18.9 | 53.2 |
| 5 | 10.2 | 11.3 | 6.9 | 6.2 | 48.5 | 17.6 | 53.1 |
| 6 | 11.5 | 11.5 | 30.0 | 6.5 | 48.0 | 19.2 | 52.0 |
| 7 | 8.7 | 12.5 | 31.3 | 6.8 | 50.1 | 19.0 | 53.0 |
| 8 | 10.1 | 13.7 | 9.4 | 7.1 | 50.1 | 16.5 | 56.6 |
| 9 | 11.2 | 14.8 | 7.2 | 7.3 | 55.8 | 17.5 | 58.5 |
| 11 | 12.3 | 14.0 | 7.7 | 8.1 | 58.4 | 20.4 | 57.4 |
| 12 | 8.7 | 12.7 | 18.5 | 6.0 | 54.7 | 18.8 | 52.1 |
| 13 | 9.7 | 11.8 | 43.9 | 6.2 | 51.0 | 18.5 | 51.1 |
| CONTROL | 10.2 | 10.1 | 70.0 | 6.4 | 39.6 | 15.6 | 50.6 |

EXAMPLE III

In Tables IV and V are listed tensile data and tensile moduli (TM) obtained on drawn filaments of a polyamide composition containing 5% ZrF$_4$ these physical characteristics are measured as functions of viscosity and draw ratio.

TABLE IV
TENSILE PROPERTIES OF DRAWN FILAMENTS CONTAINING 5% ZrF$_4$

| COMPOSITION | RED VISC. | DRAW RATIO | TENSILE STRENGTH g/d | TENSILE MODULUS g/d |
|---|---|---|---|---|
| CONTROL | 1.56 | 3.8 | 5.0 | 39.6 |
| 9 | 1.40 | 3.8 | 4.8 | 57.3 |
| CONTROL | 1.56 | 5.2 | 8.0 | 52.6 |
| 9 | 1.40 | 5.0 | 5.4 | 76.1 |
| 8 | 1.62 | 4.9 | 7.1 | 84.7 |

TABLE V
MODULUS INCREASE OF FILAMENTS CONTAINING 5% ZrF$_4$

| DRAW RATIO | | | % MODULUS INCREASE |
|---|---|---|---|
| CONTROL n = 1.56 | Composition n = 1.40 | Composition n = 1.62 | $10^2$ TM/(TM)o − 1 |
| 3.8 | 3.8 | — | 45 |
| 5.2 | 5.0 | — | 45 |
| 5.2 | — | 4.9 | 61 |

As is apparent from the data set forth in Tables I to V, the nucleation agents employed in the composition of this invention function as extremely effective nucleating agents. As compared to Nylon 6 which includes no nucleating agents, these nucleation agents provide a significant decrease in $(\Delta T_c)_m$, as well as an overall increase in moduli. Both phenomena are very desirable in both molding compositions and fibers and both phenomena characterize nucleated polyamide compositions.

As is also apparent from the above described data, especially good results are provided by zirconium tetra fluoride. In addition to providing a significant decrease in $(\Delta T_c)_m$, zirconium tetra-fluoride also increases yield strength, tensile modulus, and flexural modulus. Further, compositions comprised of zirconium tetra fluoride can be drawn by conventional means to provide melt spun multi-filaments having higher tensile moduli (TM) than the corresponding Nylon 6 which does not include a nucleation agent.

The foregoing detailed description of the invention has been given for clearness of understanding only, and no necessary limitations are to be inferred therefrom. The invention is not limited in the exact details herein shown and described, and will encompass obvious modifications which will occur to those of skill in the art in light of the appended claims.

What is claimed is:

1. A composition comprising:
   (A) a polymer selected from the group consisting of polymers having one or more carbonyl functions as an integral part of the recurring unit and polymer backbone and mixtures thereof; and
   (B) a nucleation agent selected from the group consisting of lithium metasilicate, lithium aluminate, lithium metaphosphate, manganese fluoride, zirconium tetra fluoride, zirconium silicate and mixtures thereof in an amount such that the difference $(\Delta T_c)_m$ between melting point $(T_m)$ and temperature at which crystallization is first observed upon cooling from the melt $(T_c)$ of said composition is at least 1° C. less than the $(\Delta T_c)_m$ of said polymer.

2. A composition according to claim 1 wherein said polymer is selected from the group consisting of polyester, polyamides and mixtures thereof.

3. A composition according to claim 1 wherein said agent is zirconium tetra-fluoride.

4. A composition according to claim 3 wherein said polymer is a polyamide.

5. A composition according to claim 4 wherein said polyamide is polycaprolactam.

6. A composition according to claim 3, 4 or 5 comprising from about 0.01 to about 20 weight percent of said nucleation agent, based on the total weight of said composition.

7. A composition according to claim 6 wherein the amount of said nucleation agent is from about 0.1 to about 15 weight percent.

8. A composition according to claim 6 wherein the weight percent of said nucleation agent is from about 1 to about 5 weight percent.

9. A composition comprising:
   (A) a polymer selected from the group consisting of polymers having one or more carbonyl functions as an integral part of the recurring unit and mixtures thereof; and
   (B) zirconium tetrafluoride in an amount such that the difference $(\Delta T_c)_m$ between melting point $(T_m)$ and temperature at which crystallization is first observed upon cooling from the melt of said composition is at least 1° C. less than the $(\Delta T_c)_m$ of said polymer, and such that the modulus of said composition is greater than the modulus of said polymer.

* * * * *